US008594863B2

(12) United States Patent
Coulmeau et al.

(10) Patent No.: US 8,594,863 B2
(45) Date of Patent: Nov. 26, 2013

(54) METHOD AND DEVICE FOR AIDING THE MANAGEMENT OF AN AIRCRAFT FLIGHT RECEIVING A CONTROL CLEARANCE

(75) Inventors: François Coulmeau, Seilh (FR); Xavier Blanchon, Toulouse (FR); Christophe Caillaud, Blagnac (FR)

(73) Assignee: Thales, Neuilly sur Seine (FR)

( * ) Notice: Subject to any disclaimer, the term of this patent is extended or adjusted under 35 U.S.C. 154(b) by 522 days.

(21) Appl. No.: 12/896,698

(22) Filed: Oct. 1, 2010

(65) Prior Publication Data

US 2011/0246053 A1 Oct. 6, 2011

(30) Foreign Application Priority Data

Oct. 2, 2009 (FR) ..................................... 09 04719

(51) Int. Cl.

| | |
|---|---|
| ***G01C 23/00*** | (2006.01) |
| ***G06F 7/00*** | (2006.01) |
| ***G06F 19/00*** | (2011.01) |
| ***G05D 1/00*** | (2006.01) |
| ***G05D 3/00*** | (2006.01) |

(52) U.S. Cl.
USPC .............. 701/14; 701/3; 701/4; 701/8; 701/9; 701/418; 701/120; 701/121; 701/122

(58) Field of Classification Search
USPC ......................................................... 340/948
See application file for complete search history.

(56) References Cited

U.S. PATENT DOCUMENTS

| | | | | |
|---|---|---|---|---|
| 4,825,374 | A * | 4/1989 | King et al. | 701/5 |
| 6,173,159 | B1 * | 1/2001 | Wright et al. | 455/66.1 |
| 6,922,631 | B1 * | 7/2005 | Dwyer et al. | 701/528 |
| 7,379,795 | B2 * | 5/2008 | Arnouse | 701/3 |
| 7,499,771 | B2 * | 3/2009 | Caillaud | 701/3 |
| 7,979,199 | B2 * | 7/2011 | Judd et al. | 701/120 |
| 8,160,759 | B2 * | 4/2012 | Baker et al. | 701/16 |
| 8,321,069 | B2 * | 11/2012 | Vasek et al. | 701/3 |
| 2007/0129857 | A1 * | 6/2007 | Fortier | 701/16 |
| 2007/0219678 | A1 * | 9/2007 | Coulmeau | 701/3 |
| 2007/0288129 | A1 * | 12/2007 | Komer et al. | 701/3 |

(Continued)

FOREIGN PATENT DOCUMENTS

| | | |
|---|---|---|
| EP | 1 323 151 B1 | 6/2004 |
| FR | 2 894 366 A1 | 6/2007 |
| FR | 2 910 124 A1 | 6/2008 |
| FR | 2 913 799 A1 | 9/2008 |

*Primary Examiner* — Khoi Tran
*Assistant Examiner* — Bao Long T Nguyen
(74) *Attorney, Agent, or Firm* — Baker & Hostetler LLP

(57) ABSTRACT

A method for aiding the management of an aircraft flight according to an active flight plan receiving a control clearance transmitted at a current time includes a step of computing a reception flight plan based on the said control clearance, a step of storing the said reception flight plan in a memory space dedicated to the said reception flight plan. The method also includes, prior to the step of computing a reception flight plan: a step of determining the time, called the recognition time, assumed to have to elapse between the current time and a time at which the said control clearance is assumed to be recognized; a step of attribution, to the said control clearance, of a destination flight plan as a function of the recognition time, the said destination flight plan being the temporary flight plan when the recognition time is included in a first time slot and the destination flight plan being a secondary flight plan when the recognition time is included in a second time slot longer than the first time slot.

18 Claims, 13 Drawing Sheets

(56) References Cited

U.S. PATENT DOCUMENTS

2008/0065312 A1* 3/2008 Coulmeau et al. ............ 701/122
2008/0071434 A1* 3/2008 Fortier et al. ................... 701/15
2008/0154486 A1 6/2008 Coulmeau
2008/0294335 A1 11/2008 Bitar et al.
2009/0055035 A1 2/2009 Caillaud
2009/0125222 A1* 5/2009 McCullough et al. ........ 701/120
2009/0177342 A1* 7/2009 Gutierrez-Castaneda ...... 701/11
2010/0241345 A1* 9/2010 Cornell et al. ................ 701/120

* cited by examiner

WHEN THE MEMORY SPACE DEDICATED TO THE STORAGE OF THE DESTINATION FLIGHT PLAN IS VACANT, THE RECEPTION FLIGHT PLAN IS THE DESTINATION FLIGHT PLAN AND WHEN THE MEMORY SPACE DEDICATED TO THE DESTINATION FLIGHT PLAN IS OCCUPIED, EITHER THE CONTROL CLEARANCE IS REFUSED; OR THE RECEPTION FLIGHT PLAN IS A BUFFER FLIGHT PLAN, OR WHEN THE DESTINATION FLIGHT PLAN IS THE TEMPORARY FLIGHT PLAN, RESPECTIVELY A SECONDARY FLIGHT PLAN, THE RECEPTION FLIGHT PLAN IS A SECONDARY FLIGHT PLAN, RESPECTIVELY THE TEMPORARY FLIGHT PLAN

Figure 6

IF THE CONTROL CLEARANCE IS DISTINCT FROM ONE OF THE FOLLOWING MESSAGES, THE RECEPTION FLIGHT PLAN IS THE DESTINATION FLIGHT PLAN PVD: PROCEED BACK ON ROUTE, RESUME OWN NAVIGATION, CLIMB TO[ALTITUDE], DESCEND TO[ALTITUDE], CRUISE CLIMB TO[ALTITUDE], CRUISE CLIMB ABOVE[ALTITUDE], EXPEDITE CLIMB TO[ALTITUDE], EXPEDITE DESCENT TO[ALTITUDE], IMMEDIATELY CLIMB TO[ALTITUDE], IMMEDIATELY DESCEND TO[ALTITUDE], OTHERWISE THE RECEPTION FLIGHT PLAN IS THE ACTIVE FLIGHT PLAN

Figure 8

WHEN THE MEMORY SPACE DEDICATED TO THE RECEPTION FLIGHT PLAN IS OCCUPIED BY A CURRENT RECEPTION FLIGHT PLAN, THE RECEPTION FLIGHT PLAN IS COMPUTED ALSO BASED ON THE SAID CURRENT RECEPTION FLIGHT PLAN

Figure 9

THE FIRST TIME SLOT EXTENDS BETWEEN 0 AND 5 MINUTES, THE LIMIT VALUE OF 5 MINUTES BEING EXCLUDED FROM THE FIRST TIME SLOT, AND PREFERABLY BETWEEN 30 SECONDS AND ONE MINUTE; THE SECOND TIME SLOT COMPRISES TIMES LONGER THAN OR EQUAL TO 5 MINUTES AND PREFERABLY BETWEEN 5 MINUTES AND 15 MINUTES OR BETWEEN 10 MINUTES AND 15 MINUTES

Figure 11

WHEN THE CONTROL CLEARANCE IS A CONDITIONAL-ACTION HEADING CLEARANCE SIGNIFYING THAT A NEXT HEADING IS ASSUMED TO HAVE TO BE FOLLOWED FROM A CONDITIONAL TIME AT WHICH A CONDITION IS VERIFIED, IT COMPRISES A STEP OF DISPLAYING THE NEXT HEADING AND THE CURRENT HEADING FOLLOWED BY THE AIRCRAFT AT THE CURRENT TIME

Figure 13

THE RECOGNITION TIME IS COMPUTED BASED ON A MODIFICATION TIME CORRESPONDING TO THE TIME ASSUMED TO HAVE TO ELAPSE BETWEEN THE CURRENT TIME AND THE TIME AT WHICH THE SAID CLEARANCE MODIFIES THE FLIGHT PLAN AND, WHEN THE CONTROL CLEARANCE IS AN IMMEDIATE-ACTION CLEARANCE, THE MODIFICATION TIME IS ZERO; WHEN THE CONTROL CLEARANCE IS A CONDITIONAL-ACTION CLEARANCE ASSUMED TO HAVE TO MODIFY THE FLIGHT PLAN AT A CONDITIONAL TIME AT WHICH A CONDITION IS ASSUMED TO BE VERIFIED, THE MODIFICATION TIME IS EQUAL TO THE DIFFERENCE BETWEEN THE CONDITIONAL TIME AND THE CURRENT TIME, THE CONDITIONAL TIME BEING: EQUAL TO A PREDETERMINED TIME, WHEN THE CONDITION IS A PREDETERMINED TIME, EQUAL TO THE TIME AT WHICH THE AIRCRAFT IS ASSUMED TO REACH A PREDETERMINED HORIZONTAL POSITION, RESPECTIVELY A PREDETERMINED ALTITUDE, BY FOLLOWING THE SAID ACTIVE FLIGHT PLAN, WHEN THE CONDITION IS A CONDITION OF PASSAGE AT THE SAID PREDETERMINED HORIZONTAL POSITION, RESPECTIVELY AT THE SAID PREDETERMINED ALTITUDE

Figure 14

METHOD AND DEVICE FOR AIDING THE MANAGEMENT OF AN AIRCRAFT FLIGHT RECEIVING A CONTROL CLEARANCE

CROSS-REFERENCE TO RELATED APPLICATION

This application claims priority to foreign French patent application No. FR 09 04719, filed on Oct. 2, 2009, the disclosure of which is incorporated by reference in its entirety.

FIELD OF THE INVENTION

The invention relates to a method for aiding the management of an aircraft flight receiving flight settings.

BACKGROUND

The increase in air traffic in the last 50 years and the growth assumptions for the next 20 years are leading to a progressive saturation of the frequency band allocated for aviation voice communications. The solution found by those involved in the aviation world is a progressive migration from "voice" as a means of communication to the digital link ("data"). This involves converting into a set of given messages the "voice" instructions and dialogues between the ground and the cockpit. The flight settings thus converted are called flight clearances. The clearances are sent from an air traffic control (ATC) station on the ground by means of a digital link to a flight management system (FMS) of an aircraft. The clearances are communicated by the ATC to a ground/cockpit communication system called the CMU ("Communication Management Unit") of the FMS. During the flight, unexpected events occur that will modify the flight plan that the aircraft is in the process of following, called the active flight plan. On this occasion, the ATC sends to the aircraft, by means of digital links, flight clearances that can be classified into several categories:

- communication identification and management messages CONTACT BRELO 123.00, DUE TO TRAFFIC etc. . . . , intended to be displayed on a screen and to be sent to an item of frequency-selection equipment,
- context and response messages of the type UNABLE, STANDBY, ROGER, etc. . . . , intended to be displayed on a screen,
- control clearances which correspond to actions to be performed, of the type "CLIMB", "CROSS", "DEVIATE", "REDUCE SPEED", "MAINTAIN[speed]" etc. The actions are intended to modify the active flight plan.

The navigation-aid system FMS conventionally assists the crew in the programming of the flight plan before take-off and in following the trajectory of the flight plan from take-off to landing. A flight plan is a trajectory assumed to have to be followed by the aircraft. The trajectory comprises a lateral trajectory which is usually characterized by a chronological sequence of segments connecting, by twos, waypoints described by their position in the horizontal plane and arcs of a circle both for making the heading transitions between segments at the waypoints and for following certain curved segments. The trajectory also comprises a vertical profile, corresponding to an estimate of the trajectory of the aircraft in the vertical plane, optimized on the lateral trajectory. The waypoints are characterized by their respective passage times.

Conventionally, the FMS comprises an FPLN ("Flight Planning") function for managing the flight plans which computes a flight plan. This function conventionally manages a plurality of memory spaces capable of storing various types of flight plan including:

- an active flight plan: which is the flight plan currently being carried out by the crew, on which the aeroplane is guided,
- a temporary flight plan, or modified flight plan: which is a working flight plan, conventionally created from an active flight plan in order to modify the active flight plan. More precisely, the temporary flight plan is created from an active flight plan in order to take account of instructions, modifying the active flight plan, which will be effective within a time horizon of less than a few minutes (of less than one minute to five minutes, limits not included, depending on the necessary speed of reaction corresponding to the flight phase that is in progress). The data stored in the memory space dedicated to the active flight plan are copied into a memory space dedicated to a temporary flight plan. This is a temporary draft which allows the crew to make changes to the active flight plan and to view the temporary flight plan thus created before activating it. When a temporary flight plan is activated, this has the effect of replacing the active flight plan with the temporary flight plan and of deleting the temporary plan. More precisely, the content of the memory space dedicated to the active flight plan is replaced by the content of the memory space dedicated to the temporary flight plan.
- one (or more) secondary flight plan(s), which are additional flight plans usually used to make more strategic modifications, that is to say which are taken into account in the longer term. The secondary flight plans are used to take account of the instructions, modifying the active flight plan or relating to a new flight plan, which will take effect on a more distant time horizon than for the temporary flight plan (typically at least equal to 5 minutes). The secondary flight plan can be used for predicted break routes, in order to prepare the next flight in domestic operations or to consult the impact of a route change. Secondary flight plans are not necessarily associated with the aeroplane in which they are produced. The pilot may enter therein, for example, his return flight plan, or flight plans with different diversion and/or destination-change options. The secondary flight plan can be activated at any time. In this case, the data stored in the dedicated space are not necessarily deleted in order to allow the pilot to test changes to the flight plan which has become active. The secondary flight plan can also be created from the active flight plan.

Secondary and temporary flight plans differ in their presentation to the crew (different pages, different colours, different change options, different prediction computation assumptions). These types of flight plan are specified in the international aviation standard AEEC ARINC 702A "Flight Management System", in section "4.3.2—Flight planning". The temporary flight plan respectively secondary flight plan is identified as the "modified flight plan", respectively the "secondary flight plan."

Currently, manufacturers include the control clearances in a default flight plan. In other words, a default flight plan is computed based on the control setting. The default flight plan is, for certain manufacturers, the active flight plan, for others the temporary flight plan and for some a secondary flight plan. Because the default flight plan is always the same flight plan, the inclusion of a control setting in this flight plan is not always suitable for the use that the pilot makes of it as a function of the flight setting. The pilot is therefore regularly required to transfer a clearance into a flight plan other than that in which it has been included. This type of action is time-consuming for the pilot.

The object of the invention is to alleviate the aforementioned drawbacks.

SUMMARY OF THE INVENTION

Accordingly, the subject of the invention is a method for aiding the management of an aircraft flight according to an active flight plan receiving a control clearance transmitted at a current time comprising a step of computing a reception flight plan based on the said control clearance, a step of storing the said reception flight plan in a memory space dedicated to the said reception flight plan and prior to the step of computing a reception flight plan.

- a step of determining the time, called the recognition time, assumed to have to elapse between the current time and a time at which the said control clearance is assumed to be recognized,
- a step of attribution, to the said control clearance, of a destination flight plan, as a function of the recognition time, the said destination flight plan being the temporary flight plan when the recognition time is included in a first time slot and the destination flight plan being a secondary flight plan when the recognition time is included in a second time slot longer than the first time slot.

The method also optionally comprises the following features, taken alone or in combination:

- the reception flight plan is the destination flight plan;
- when the memory space dedicated to the storage of the destination flight plan is vacant, the reception flight plan is the destination flight plan and when the memory space dedicated to the destination flight plan is occupied, either the said control clearance is refused; or the reception flight plan is a buffer flight plan, or when the destination flight plan is the temporary flight plan, respectively a secondary flight plan, the reception flight plan is a secondary flight plan, respectively the temporary flight plan;
- subsequent to the step of storing the said reception flight plan, it comprises a step of copying the said reception flight plan into the memory space dedicated to the destination flight plan when the latter is empty;
- if the said control clearance is distinct from one of the following messages, the reception flight plan is the destination flight plan PVD: PROCEED BACK ON ROUTE, RESUME OWN NAVIGATION, CLIMB TO[altitude], DESCEND TO[altitude], CRUISE CLIMB TO[altitude], CRUISE CLIMB ABOVE[altitude], EXPEDITE CLIMB TO[altitude], EXPEDITE DESCENT TO[altitude], IMMEDIATELY CLIMB TO[altitude], IMMEDIATELY DESCEND TO[altitude], otherwise the reception flight plan is the active flight plan,
- when the memory space dedicated to the reception flight plan is occupied by a current reception flight plan, the said reception flight plan is computed also based on the said current reception flight plan;
- when the memory space dedicated to the said reception flight plan is vacant, the reception flight plan is also computed based on the active flight plan;
- the first time slot extends between 0 and 5 minutes, the limit value of 5 minutes being excluded from the first time slot, and preferably between 30 seconds and one minute; the second time slot comprises times longer than or equal to 5 minutes and preferably between 5 minutes and 15 minutes or between 10 minutes and 15 minutes,
- the recognition time is computed based on a modification time corresponding to the time assumed to have to elapse between the current time and the time at which the said clearance modifies the flight plan, when the control clearance is an immediate-action clearance, the modification time is zero, when the control clearance is a conditional-action clearance assumed to have to modify the flight plan at a conditional time at which a condition is assumed to be verified, the modification time is equal to the difference between the conditional time and the current time and, when the condition is a predetermined time, the conditional time being equal to:
  - a predetermined time, when the condition is a predetermined time,
  - to the time at which the aircraft is assumed to reach the predetermined horizontal position, respectively the predetermined altitude, by following the said active flight plan, when the condition is a condition of passage at a predetermined horizontal position, respectively at a predetermined altitude.
- the recognition time is equal to the modification time,
- when the control clearance is a conditional-action heading clearance signifying that a next heading is assumed to have to be followed from a conditional time at which a condition is verified, it comprises a step of displaying the next heading and the current heading followed by the aircraft at the current time.

A further subject of the invention is device for aiding the management of a flight capable of applying the method as described above, characterized in that it comprises:

- an on-board communication computer, capable of receiving control clearances,
- an analyser router capable of determining the recognition time of a control clearance received by the on-board communication computer, and of attributing a destination flight plan to the said control clearance as a function of the said recognition time, the said destination flight plan being the temporary flight plan when the recognition time is included in a first time slot and the destination flight plan is the secondary flight plan when the recognition time is included in a second time slot, longer than the first time slot,
- a means for computing a reception flight plan based on the said control clearance,
- at least one storage space dedicated to the storage of the said reception flight plan.

The device also optionally comprises the following features, taken alone or in combination:

- it comprises a man-machine interface comprising at least one screen, the said first screen(s) belonging to a flight control unit FCU and the said flight control unit comprises a first window capable of displaying the value of the current heading followed by the aircraft at the current moment, a second window capable of displaying the value of the next heading that the aircraft is assumed to have to follow determined by a heading control clearance and a selection means for allowing the pilot to select from the current heading and the next heading a heading assumed to have to be followed by the aircraft;
- it comprises a means for selecting a substitution flight plan allowing the crew to initiate the copying of the reception flight plan into a memory space dedicated to the storage of a substitution flight plan of its choice, distinct from the reception flight plan;

it comprises a means for cancelling the insertion of a control clearance into a reception flight plan;

it comprises a means for initiating the computation of the destination flight plan based on the said flight clearance and the storage of the latter in a dedicated storage space.

The method for aiding the management of a flight according to the invention makes it possible to insert the control clearances while taking account of their operational use by the crew. In particular, it makes it possible to comply with the spirit in which the crew works: when the crew makes manual changes of flight plan, it naturally works with the temporary flight plan for all the tactical operations and it naturally works in a secondary flight plan for all the strategic operations.

It also makes it possible to reduce the workload of the pilot by reducing the number of manipulations of the flight plan and to improve the speed of recognition of the control clearances. For example, the crew is no longer faced with the problem of having to manage a tactical clearance (which requires a rapid recognition) when the latter has been automatically incorporated into the secondary flight plan. Specifically, in this case, in the prior art, the pilot had to carry out awkward manipulations (copies, deleting, etc.) which occupied him considerably for loading this setting into the active flight plan. Moreover, these manipulations had the effect of delaying the recognition of the flight clearance. The method according to the invention also makes it possible to prevent polluting the crew with tactical messages that arrive in a secondary or conversely by inserting a strategic clearance into an active flight plan (while the pilot is occupied doing other things).

BRIEF DESCRIPTION OF THE DRAWINGS

Other features and advantages of the invention will appear on reading the following detailed description, given as a non-limiting example and with reference to the appended drawings in which:

FIGS. 5, 6, 7, 8, 9, 10, 11, 12, 13, and 14 represent flight control embodiments according to the invention.

From one figure to the next, the same elements are identified by the same references.

DETAILED DESCRIPTION

Figure 1:
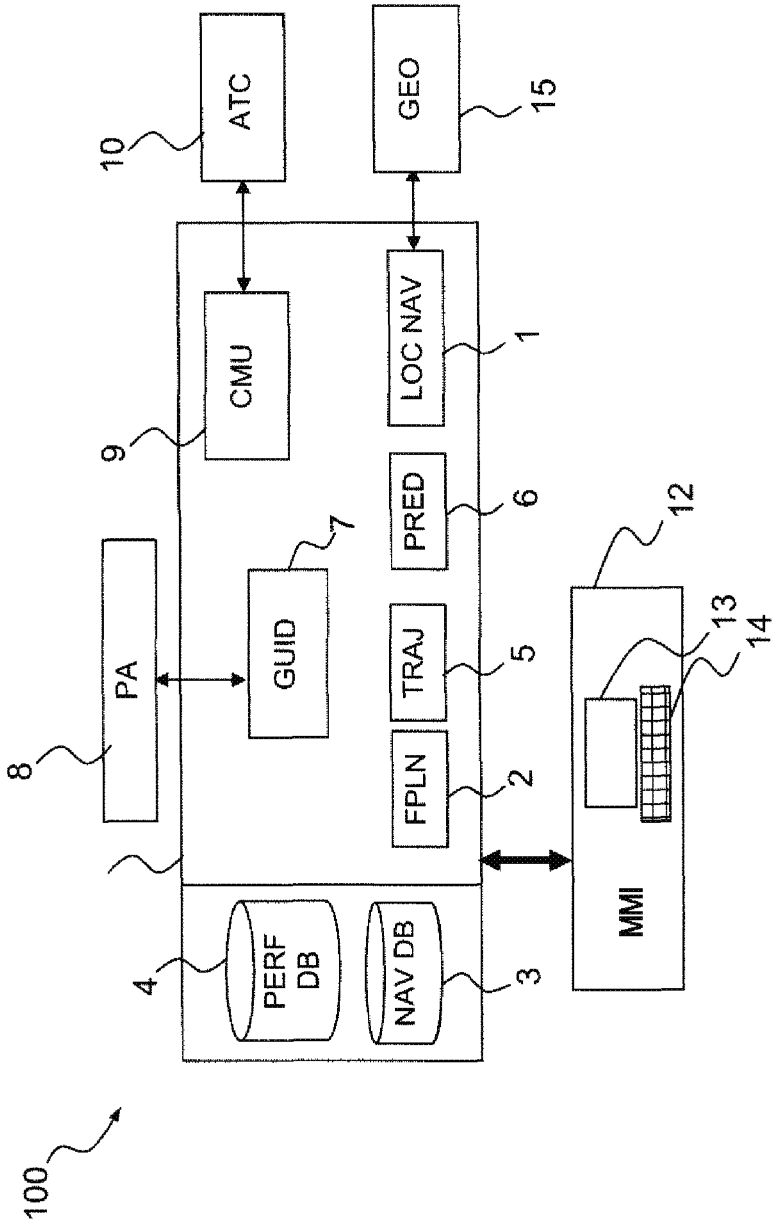
FIG. 1 represents schematically a flight management system and peripheral elements.

FIG. 1 shows a simplified block diagram of a conventional flight management device (FMS) 100 for an aircraft and of conventional peripheral functions. An FMS performs all or some of the following functions that are described in ARINC standard 702A (Advanced Flight Management Computer System, December 1996):

navigation LOC NAV, 1, for carrying out the optimal location of the aircraft as a function of the geo-location means GEO, 15; (GPS, GALILEO, VHF radio beacons, inertial navigation units), navigation database NAV DB, 3, for storing data of the points, beacons, intercept or altitude legs type, etc., flight plan FPLN, 2, for storing the geographic elements (entered by an operator) constituting the skeleton of the route to be followed, namely departure and arrival procedures, waypoints, and airways, and for constructing the flight plan based on these elements and on data stored in the database NAV DB, performance database PERF DB, 4, containing the aerodynamic parameters and the parameters of the engines of the craft, function for computing a lateral trajectory TRAJ, 5, for constructing a continuous trajectory based on the points of the flight plan, complying with the performance of the aircraft and the confinement requirements (RNP), prediction function PRED, 6, for constructing an optimized vertical profile on the lateral trajectory, guidance function, GUID, 7, for guiding the aircraft in the lateral and vertical planes on its trajectory, while optimizing its speed, in association with an automatic pilot PA, 8, an on-board communication computer, hereinafter called CMU (for "Communication Management Unit") 9, capable of communicating with the control centres ATC, 10.

The FMS is conventionally connected to a man-machine interface MMI, 12, comprising one or more display screens 13 and a keyboard 14.

Figure 2:
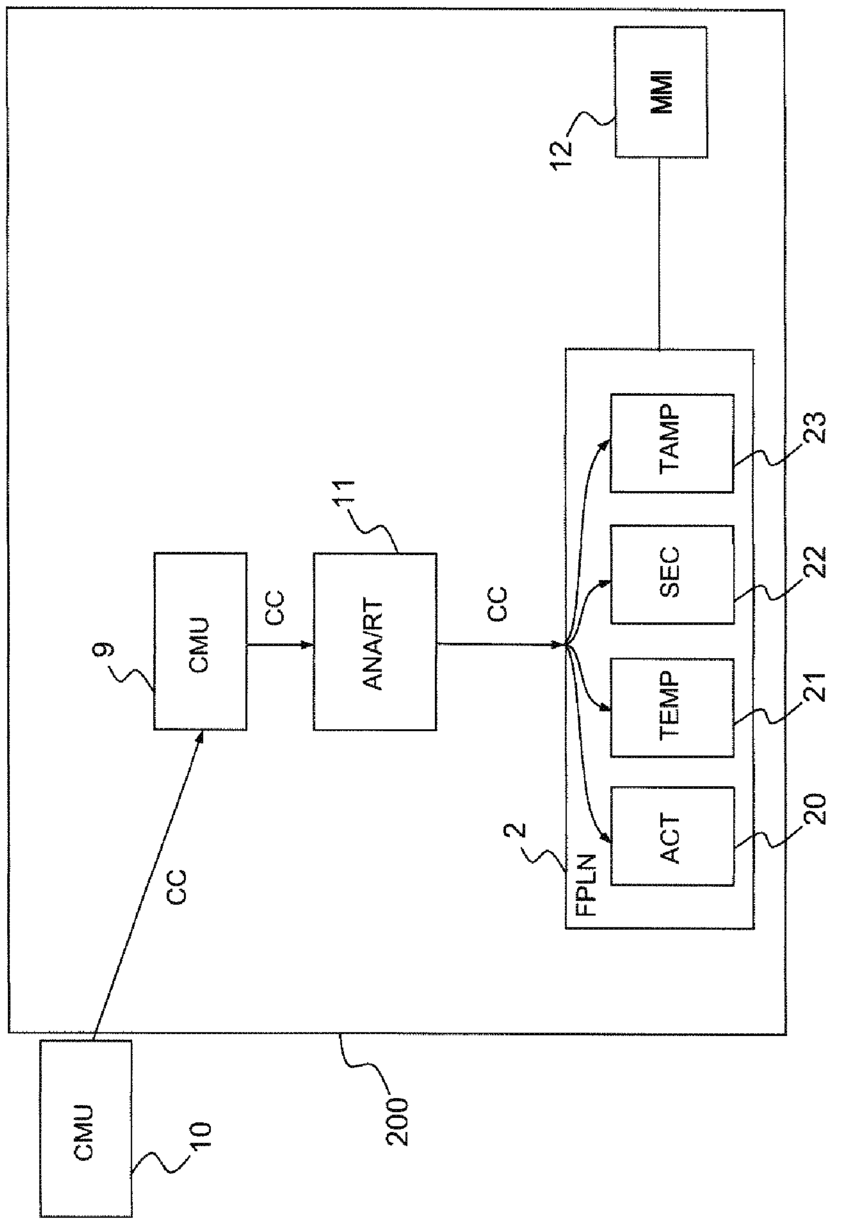
FIG. 2 represents a device according to the invention.

Shown in the block diagram of FIG. 2 is a device 200 according to the invention. The device 200 comprises an on-board communication computer, CMU 9, which is responsible for receiving the flight settings sent by air traffic controllers 10. The on-board communication computer CMU, 9 transmits the control clearances to an analyser/router ANA/RT, referenced 11, which analyses them, attributes a destination flight plan to them and transmits them to the flight plan function FPLN, 2 which is capable of computing a reception flight plan based on the flight clearance and of storing the reception flight plan thus computed in a memory space dedicated to the storage of the said flight plan. The flight plan function is in reality an assembly comprising a computer not shown and spaces for storing the flight plans. It will be called in the rest of the text a flight plan module for greater clarity.

As will be seen below, the destination flight plan is either the temporary flight plan or a secondary flight plan. Shown in FIG. 2, in the flight plan module FPLN, is an active memory space ACT, 20 dedicated to the storage of the active flight plan; a temporary memory space, TEMP, 21, dedicated to the storage of a temporary flight plan, a secondary memory space, dedicated to the storage of a secondary flight plan SEC, 22, and a buffer memory space TAMP, 23, dedicated to the storage of a 'buffer' flight plan. As a variant, the flight plan module FPLN manages several memory spaces dedicated to several secondary flight plans. This allows the pilot to test independently several modifications. It is possible, for example, to test, in a first memory space dedicated to the secondary flight plan, modifications that it is desired to make to the active flight plan and, in a second memory space dedicated to the secondary flight plan, construct the return flight plan.

The pilot can consult each flight plan (except the buffer flight plan) by displaying it on a screen of a man-machine interface 12 connected to the FMS. As explained above, the pilot can also activate the secondary and temporary flight plans, that is to say copy the data stored in a temporary or secondary memory space into the active memory space. If the active memory space ACT, 20, is occupied, these new data replace the data that were stored in the active memory space. A buffer flight plan is a flight plan internal to the flight plan function FPLN, not accessible to the pilot, that is to say not modifiable or editable by the pilot. On the other hand, the pilot can copy a flight plan saved in the buffer memory TAMP, 23 into a temporary or secondary memory space. If the temporary or secondary memory space is occupied, these new data replace the data that were stored in the temporary or secondary memory space.

Figure 3:
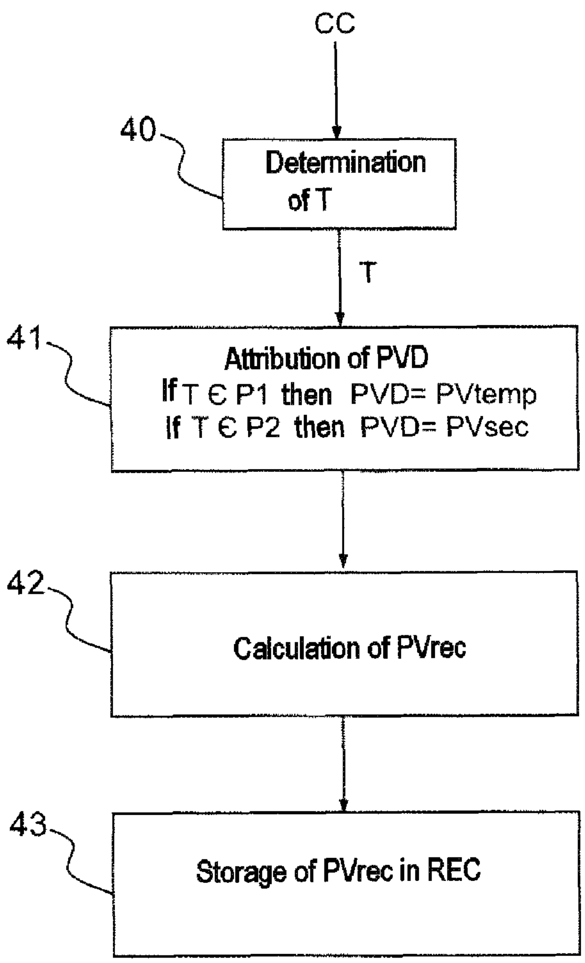
FIG. 3 represents the steps of the method according to the invention.

As shown in FIG. 3, the method for aiding the management of an aircraft flight according to the invention comprises the following steps when the aircraft receives a control clearance CC:

a step 40 of determining the recognition time T, assumed to have to elapse between the current time and the time at which the said clearance is recognized, a step 41 of attributing, to the said control clearance CC, a destination flight plan PVD according to the recognition time T, a step 42 of computing a reception flight plan PVrec based on the said control clearance CC, a step 43 of storing the said reception flight plan PVrec thus computed in a memory space REC dedicated to the storage of the said reception flight plan PVrec.

In the method according to the invention, the focus is only on the control clearances CC. These are actions to be carried out that have an impact on the flight plan, that is to say that are intended to modify the active flight plan. The control clearances are grouped into the following categories:

heading, speed, altitude clearances which have a respective impact on the heading followed by the aircraft, the speed of the aircraft and the altitude of the aircraft. They also include the route clearances by which the air traffic control authorities ask the pilot to modify the waypoints between two elements of the active flight plan.

The actions to be carried out are, for example, actions to be carried out instantaneously, such as for example in a non-exhaustive manner for the:

speed clearances, messages of the "MAINTAIN [speed]" type (to maintain a speed equal to [speed]), "INCREASE [speed] to [speed]" (increase speed up to a value equal to [speed]), "REDUCE [speed] to [speed]" (reduce speed to a value equal to [speed]), "ADJUST [speed]" (adjust speed), "DO NOT EXCEED [speed]" "(do not exceed [speed]), "CLIMB AT [vertical Rate]" climb at a vertical speed equal to [verticale Rate], "MAINTAIN PRESENT SPEED" maintain present speed, "MAINTAIN[speed] TO[speed] maintain a speed between two limits, "ADJUST SPEED TO [speed]" (adjust speed to [speed]), "RESUME NORMAL SPEED" (resume normal speed), "NO SPEED RESTRICTION" (no speed restriction), "REDUCE TO MINIMUM APPROACH SPEED" (reduce speed to minimum approach speed).

heading clearances, message of the type "TURN [direction]"(turn in the direction [direction]), "FLY PRESENT HEADING" (follow the present heading), "FLY HEADING [degrees]" (follow the heading [degrees]), "STOP TURN HEADING [degrees]" (level out wings immediately).

for the instructions for maintaining or changing level, they are instructions of the type "MAINTAIN or CLIMB TO or DESCEND TO or IMMEDIATELY CLIMB TO [level]" (maintain or climb to or descend to or climb immediately to the altitude [level]), "MAINTAIN BLOCK[level] TO[level]" maintain altitude between two limits, "CRUISE CLIMB TO (or ABOVE) [level]" (climb to a new cruise level, [level]), "STOP CLIMB (or DESCEND) AT [level]" (stop climbing (or descending) at the altitude of value [level]).

route clearances, messages of the type "CROSS [position] AT or [time] or [level] or [speed]" (cross the horizontal position [position] at the time [time] or at the altitude [level] or at the speed [speed]), "REJOIN ROUTE BY [position] or [time]" (rejoin the flight plan at the horizontal position [position] or at the time [time]), "OFFSET [specifiedDistance] [direction] OF ROUTE" (fly on a route parallel to the initial route in the direction [direction] at a distance [SpecifiedDistance], "PROCEED BACK ON ROUTE" (rejoin the flight plan), "RESUME OWN NAVIGATION [DepartureClearance] (add a departure procedure [DepartureClearance] to the flight plan), "PROCEED DIRECT TO [position]" (go directly to the point [position]), "WHEN ABLE PROCEED DIRECT TO [position]", "CLEARED TO [position] VIA [routeClearance]" (replace the part of the active flight plan between the aeroplane and the point [position] with a new route [Routeclearance], "CLEARED [routeClearance] (or [procedureName])" (replace the route with a route clearance [routeClearance] or with a procedure [procedureName]), "CLEARED TO DEVIATE UP TO [specifiedDistance] [direction] OF ROUTE" authorization to deviate from the initial route in the direction [direction] to a distance [SpecifiedDistance], "CROSS [position] AT OR ABOVE or AT OR BELOW [level]" (cross the horizontal position [position] at least or at most at the altitude [level]), "CROSS [position] BETWEEN [level] (or [time] or [speed]) AND [level] (or [time] or [speed])" (cross the horizontal position [position] between two given altitudes (or times or speeds)), "CROSS [position] AT OR BEFORE (or AT OR AFTER) [time]", (cross the horizontal position [position] at the latest at or at the earliest at the time [time]). The following clearances are not converted, the conversions are deduced from the above conversions: CROSS [position] AT OR BEFORE [time] AT [level], CROSS [position] AT OR AFTER [time] AT [level], CROSS [position] AT AND MAINTAIN [level] AT [speed], AT [time], CROSS [position] AT AND MAINTAIN [level], AT [time], CROSS [position] AT AND MAINTAIN [level] AT [speed].

"Horizontal position" means the position of the aircraft in the horizontal plane.

The recognition time T is defined as being the time after which the instruction is assumed to have to be recognized from the current time at which it has been transmitted. In other words, the recognition time is the time assumed to have to elapse between the current time and the time at which the instruction is assumed to have to be recognized. The recognition time is computed based on a modification time which is the time that elapses between the current time of its transmission and the time at which the said clearance is assumed to modify the active flight plan. The modification time Tm for an action to be carried out instantaneously is zero. It is said that this is a tactical instruction because it modifies the flight plan in the short term.

The control instructions can also be conditional actions by which the ATC requests the aircraft to carry out an action ACTION when a condition [condition] is fulfilled. The condition may be a condition of time or of passage at a given horizontal position or altitude. The conditional actions can instantaneously modify the active flight plan if the condition is verified at the current time. If the condition is not verified at the current time, the conditional actions can modify the flight plan later when the condition is verified. The conditional actions are, for example, of the type "AT [position] (or [time] or [level]) ACTION" (at the horizontal position [position] or at the time [time] or at the altitude [level] carry out the action ACTION). It may also involve actions of the type "ACTION BY [time] (or [level] or [position])" (carry out the action ACTION before the time [time] (or the altitude [level] or the horizontal position [position].))

A non-exhaustive list will now be given of the conditional-action control clearances and their meaning for:

heading clearances, messages of the type "AT[position] FLY HEADING[degrees]" (at the horizontal position [position] follow the heading at a value of [degrees] degrees), speed clearances, messages of the type “AFTER PASSING [position] MAINTAIN [speed]” (after the position “position” maintain speed at a value equal to [speed]), clearances to maintain or change level, messages of the type “AT[time] (or [position]) CLIMB TO (or DESCEND TO) [level]” (at the time [time] or at the horizontal position [position] climb (or descend) to the altitude [level]), “CLIMB (or DESCEND) TO REACH[level] BY [time] (or [position])” (climb (or descend) to reach altitude [level] at the time [time] (or at the horizontal position [position])), “AFTER PASSING[position] CLIMB TO (or DESCEND TO) [level]” (after position [position] climb (or descend) to altitude [level]), “REACH [level] BY[position] or [time]” (Reach altitude [level] at the horizontal position [position] or at the time [time]), route clearances, messages of the type “AT [position] (or [time]) OFFSET [specifiedDistance] [direction] OF ROUTE” at the time [time], fly on a route parallel to the initial route in the direction [direction] at a distance [SpecifiedDistance], “AT [time] (or [position] or [level]) PROCEED DIRECT TO [position]”, (at the time [Time] (or at the position [position] or at the altitude [level]), go directly to the point [position], “AT [position] CLEARED [routeClearance] (or [procedureName])” (at the horizontal position [position] replace the value of the route with [routeClearance] (or [procedureName]), “HOLD AT [position] MAINTAIN [level]”, (at the horizontal position [position] make a holding circuit (go around) at the altitude [level]).

When the conditional action modifies the flight plan in the short term, it is said that the clearance is tactical; when it modifies the flight plan in the long term, that it is strategic.

There follows now a more precise description of the step of determining the recognition time T when the clearance is a conditional action. The modification time Tm is, in this case, the time that elapses between the current time and the conditional time which is the time at which the condition [condition] is assumed to be verified, that is to say the time at which the said condition is assumed to modify the active flight plan. When the condition is a predetermined time [time], the conditional time is equal to the predetermined time [time]. When the condition is a condition of passage at a predetermined horizontal position [position], respectively at a predetermined altitude [level], the conditional time is the time at which the aircraft is assumed to reach the horizontal position [position], respectively the predetermined altitude [level] by following the active flight plan. The conditional time of passage at a predetermined horizontal position is, for example, determined by the router 11 by means of the trajectory computation function TRAJ, 5. The conditional time of passage at a predetermined altitude is, for example, computed by using the prediction function PRED. It is the estimated time at which the aircraft will pass at the predetermined altitude if it follows the lateral trajectory of the active flight plan.

The recognition time T of the control clearance is equal either to the modification time Tm or to an adjusted value of the modification time, based on human factors, including the crew (because it is a task that is inserted amongst other tasks on board) and/or of communication time between the ground and the cockpit and/or the response time required by the controllers (i.e. the time between the sending of clearance and the response of the crew).

A destination flight plan PVD is attributed to each clearance CC according to the recognition time T. When the recognition time is in the first time slot P1, the clearance is a tactical instruction. The destination flight plan PVD is then the temporary flight plan PVtemp. When the recognition time is in a second time slot P2 longer than the first time slot P1, the control clearance CC is strategic. The destination flight plan PVD is then a secondary flight plan PVsec. “Second time slot longer than the first time slot” means that the times included in the second range of values are longer than the times included in the first range of times; these two ranges are also distinct. The first time slot P1 advantageously extends between 0 minutes and 5 minutes, the value of 5 minutes not being included in the first time slot. The first time slot preferably extends between 30 seconds and 1 minute. The second time slot P2 advantageously extends between 5 minutes (the value included in the second range) and 15 minutes and preferably between 10 minutes and 15 minutes. The values may differ depending on the future uses of the clearances, in particular depending on the degree of urgency that the players in the aviation world (controllers, crews) may define.

The method according to the invention also comprises a step 43 of computing a reception flight plan PVrec based on the said control clearance. This step is advantageously preceded by a transmission step (not shown) of the clearance to the flight plan module FPLN from the analyser/router 11, so that a computation means (not shown) included in the flight plan module FPLN, 2, computes the reception flight plan.

FIGS. 5, 6, 7, 8, 9, 10, 11, 12, 13, and 14 represent flight control embodiments according to the invention. With reference to FIGS. 5, 6, 7, 8, 9, 10, 11, 12, 13, and 14, the following embodiments are discussed.

In a first embodiment according to the invention, the reception flight plan PVrec is the destination flight plan PVD. Advantageously, in this embodiment, when the memory space dedicated to the destination flight plan is occupied by a current destination flight plan, the reception flight plan is computed based on the current destination plan and on the control clearance CC. When the memory space is vacant, the destination flight plan being the temporary flight plan PVtemp, the reception flight plan is computed based on the active flight plan and on the said clearance. When the memory space is vacant, the destination flight plan being the secondary flight plan PVsec, the reception flight plan is computed based on the said clearance and optionally based on the active flight plan.

The reception flight plan PVrec thus computed is stored in the storage space REC dedicated to the said reception flight plan. When the space dedicated to the said reception flight plan was occupied by a current reception flight plan before the insertion of the said clearance into the said flight plan, the reception flight plan computed on the basis of the said clearance replaces the current reception flight plan. This amounts to updating the current reception flight plan based on the control clearance.

Figure 4:
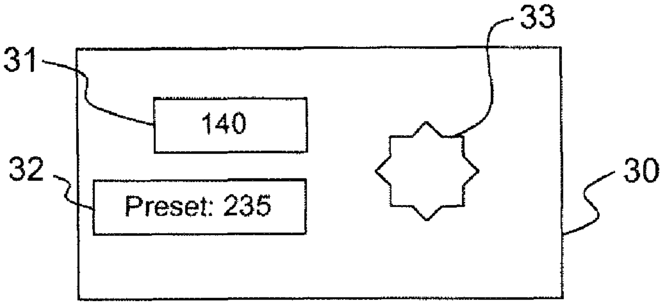
FIG. 4 represents a flight control unit of a device according to the invention.
Figure 5:
Figure 7:
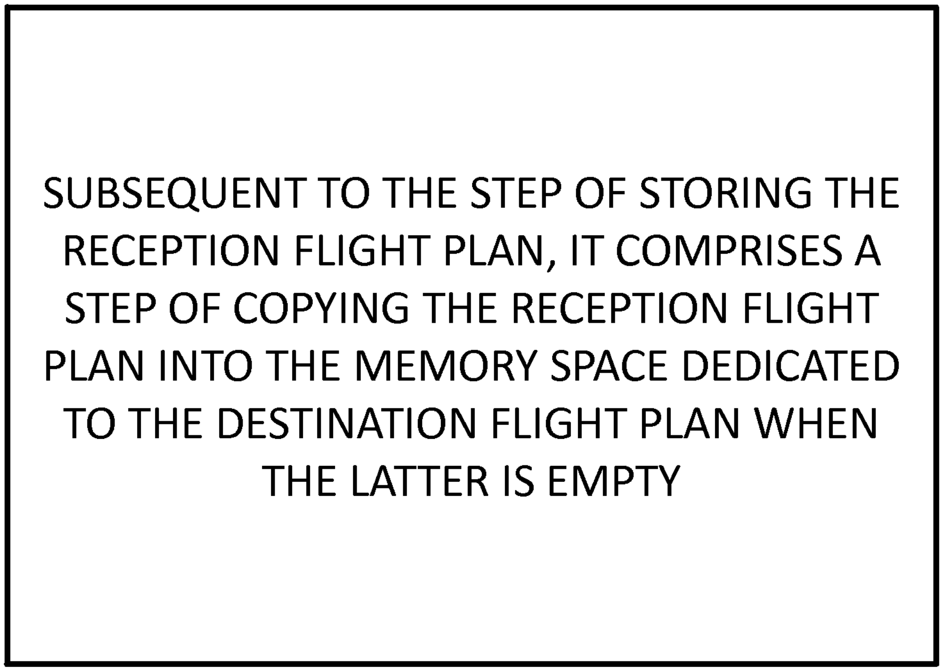
Figure 10:
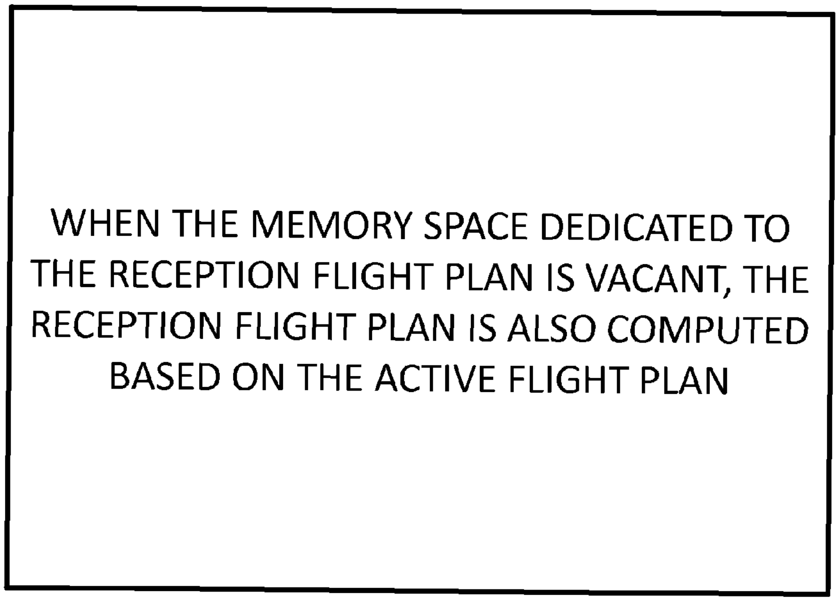
Figure 12:
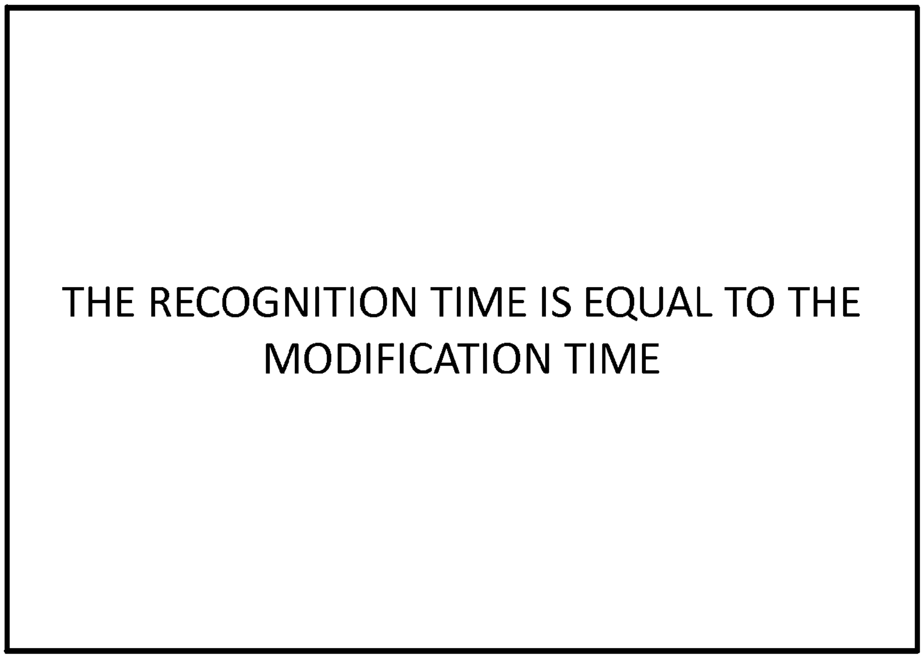

Advantageously, when the communication module CMU, 9, receives a clearance, its value is displayed on a screen 13 of a man-machine interface MMI 12. Advantageously the man-machine interface comprises a flight control unit FCU. In this case, the value of the clearance is advantageously displayed on a screen of the flight control unit FCU. This is of particular value for conditional-action heading clearances, for example of the type “AT[position]FLY HEADING[degrees]”, when the horizontal position [position] is on the lateral trajectory of the flight plan. FIG. 4 shows a portion of a flight control unit FCU 30 comprising a first window 31 and a second window 32 on which are displayed respectively the value of the current heading direction (the angle formed by the aeroplane axis with magnetic north), equal to 140° in the example shown, that the aircraft is in the process of following and the value of the next heading, equal to 235° in the example shown, that the aircraft is assumed to have to follow when the condition is verified, that is to say that the aircraft is in the process of preparing.

The flight plan management module FPLN generates, by introducing the clearances into the secondary flight plan or the temporary flight plan, a segment (or "leg") of the FM type (this leg defined in the international aviation standard AEEC Arinc 424 "Navigation System Data Base" starting from the current position to reach the heading given by the clearance, to infinity (i.e. the leg has no termination)) "course from [position] with manual termination," based on the said clearance. The flight control unit FCU 30 also comprises a means 33 for selecting the next heading that the aircraft will follow. Therefore, when the aircraft reaches the position [position], that is to say when the condition is verified, the pilot selects the next heading using the selection means 33. Thus the guidance module generates guidance settings adapted so that the aircraft follows this next heading. The value of the current heading is advantageously replaced by the value of the next heading in the first window 31.

Advantageously, a screen 13 of the man-machine interface MMI 12 is capable of displaying a flight plan and optionally the control clearance(s) based on which it has been computed. Advantageously, the method according to the invention comprises a step of notifying the pilot of the loading (that is to say of computation of the flight plan based on the said clearance and of storage of the computed flight plan) of the clearance in the reception flight plan. This step consists, for example, in displaying the destination flight plan and the said clearance.

Advantageously, the flight plan module FPLN, 2 has a function of copying the secondary flight plan(s) into the memory space dedicated to the temporary flight plan TEMP 21 (or vice versa). Advantageously, the man-machine interface MMI, 12, comprises means (not shown) allowing the crew to initiate copying of a destination flight plan into a memory space dedicated to the storage of a substitution flight plan of its choice. When data are copied from a first storage space to a second storage space, when the second storage space is not empty, the data saved in the second storage space are replaced by the data saved in the first storage space. Copying is also followed by the erasure of the data saved in the first storage space.

This function is of value when, for example, the pilot notices that a clearance loaded into the temporary flight plan requires, according to him, to be better analysed before being activated. The pilot then initiates copying of the temporary flight plan to a memory space dedicated to the storage of a substitution flight plan of his choice which is distinct from the reception flight plan. Advantageously, the substitution flight plan of a temporary flight plan is a secondary flight plan dedicated to the copying of the temporary flight plan. The flight plan module FPLN advantageously comprises a memory space dedicated to a secondary flight plan dedicated to the copying of the temporary flight plan. As a variant, the substitution flight plan is a buffer flight plan.

In a second embodiment of the method according to the invention, the reception flight plan is the destination flight plan when the memory space dedicated to the destination flight plan is vacant and is distinct from the destination flight plan when the storage space of the said destination flight plan is occupied. In this embodiment, when the destination flight plan is the temporary flight plan, respectively a secondary flight plan, the reception flight plan is a secondary flight plan, respectively the temporary flight plan. As a variant, the reception flight plan is a buffer flight plan. The buffer flight plan is advantageously computed based on the said clearance and optionally on the active flight plan. The said method optionally comprises a step of notifying the pilot of the flight plan in which the clearance is loaded. The method according to the second embodiment advantageously comprises a step of copying the reception flight plan into the storage space dedicated to the destination flight plan when the latter is emptied, that is to say when it is erased or activated.

As a variant, when the memory space 21, 22 dedicated to the destination flight plan is occupied, the clearance is not inserted into the destination flight plan (it is said that the clearance is refused) and the reason for the refusal is returned to the communication computer CMU. The pilot is notified of the reason for refusal. Advantageously, the man-machine interface has a means for forcing the loading of a refused clearance allowing the pilot to order the computation of the destination flight plan based on the said clearance and the storage of the latter in the dedicated space.

In a third embodiment of the method according to the invention, the reception flight plan is the destination flight plan unless the control clearance is one of the following messages, in which case the reception flight plan is the active flight plan: PROCEED BACK ON ROUTE, RESUME OWN NAVIGATION, CLIMB TO[level], DESCEND TO[level], CRUISE CLIMB TO[level], CRUISE, CLIMB ABOVE [level], EXPEDITE CLIMB TO[level], EXPEDITE DESCENT TO[level], IMMEDIATELY CLIMB TO[level], IMMEDIATELY DESCEND TO[level]. These clearances affect parameters usually managed directly in an active flight plan by a pilot. For example, when the message is of the type CLIMB TO [altitude] where the parameter [altitude] is higher than the cruising level chosen by the pilot, the cruise flight CRZ FL is usually directly modified in the active flight plan. It is therefore more natural to orient them towards the active flight plan.

The device according to the invention advantageously comprises means allowing the pilot to cancel the insertion of a clearance in a flight plan.

The invention claimed is:

1. A method for aiding the management of an aircraft flight according to an active flight plan with a Communication Management Unit receiving a control clearance transmitted at a current time, comprising:

a step of computing a reception flight plan based on the said control clearance with a Flight Management System, a step of storing the reception flight plan in a memory space dedicated to the said reception flight plan, and further comprising, prior to the step of computing the reception flight plan, a step of determining a time with an analyser/router, called a recognition time, assumed to have to elapse between a current time and a time at which the control clearance is assumed to be recognized, and a step of attribution executed by the analyser/router, to the control clearance, of a destination flight plan, as a function of the recognition time, the destination flight plan being a temporary flight plan when the recognition time is included in a first time slot and the destination flight plan being a secondary flight plan when the recognition time is included in a second time slot longer than the first time slot.

2. A method for aiding the management of a flight according to claim 1, in which the reception flight plan is the destination flight plan.

3. A method for aiding the management of a flight according to claim 1, in which, when a memory space dedicated to the storage of the destination flight plan is vacant, the reception flight plan is the destination flight plan and when the memory space dedicated to the destination flight plan is occupied:

either the control clearance is refused, or the reception flight plan is a buffer flight plan, or, when the destination flight plan is the temporary flight plan, and referred to as the secondary flight plan, the reception flight plan is the secondary flight plan, referred to as the temporary flight plan.

4. A method for aiding the management of a flight plan according to claim 3, in which, subsequent to the step of storing a reception flight plan, the method further comprises a step of copying the said reception flight plan into the memory space dedicated to the destination flight plan, when the latter is empty.

5. A method for aiding the management of a flight according to claim 1, in which, if the said control clearance is distinct from one of the following messages, the reception flight plan is the destination flight plan:

PROCEED BACK ON ROUTE, RESUME OWN NAVIGATION, CLIMB TO[altitude], DESCEND TO[altitude], CRUISE CLIMB TO[altitude], CRUISE CLIMB ABOVE[altitude], EXPEDITE CLIMB TO[altitude], EXPEDITE DESCENT TO[altitude], IMMEDIATELY CLIMB TO[altitude], IMMEDIATELY DESCEND TO[altitude], otherwise the reception flight plan is the active flight plan.

6. A method for aiding the management of a flight according to claim 1, in which, when the memory space dedicated to the reception flight plan is occupied by a current reception flight plan, the reception flight plan is computed also based on the current reception flight plan.

7. A method for aiding the management of a flight according to claim 1, in which, when the memory space dedicated to the reception flight plan is vacant, the reception flight plan is also computed based on the active flight plan.

8. A method for aiding the management of an aircraft flight according to claim 1, in which the first time slot extends between 0 and 5 minutes, the limit value of 5 minutes being excluded from the first time slot.

9. A method for aiding the management of an aircraft flight according to claim 8, in which the first time slot extends between 30 seconds and one minute.

10. A method for aiding the management of a flight according to claim 1, in which the second time slot comprises times longer than or equal to 5 minutes and preferably between 5 minutes and 15 minutes or between 10 minutes and 15 minutes.

11. A method for aiding the management of a flight according to claim 1, in which the recognition time is computed based on a modification time corresponding to a time assumed to have to elapse between the current time and the time at which the control clearance modifies a flight plan and, when the control clearance is an immediate-action clearance, the modification time is zero; when the control clearance is a conditional-action clearance assumed to have to modify the flight plan at a conditional time at which a condition is assumed to be verified, the modification time is equal to the difference between the conditional time and the current time, the conditional time being:

equal to a predetermined time, when the condition is a predetermined time, equal to a time at which the aircraft is assumed to reach a predetermined horizontal position, respectively a predetermined altitude, by following the active flight plan, when the condition is a condition of passage at the predetermined horizontal position, respectively at the said predetermined altitude.

12. A method for aiding the management of a flight according to claim 11, in which the recognition time is equal to the modification time.

13. A method for aiding the management of a flight according to claim 1, in which, when the control clearance is a conditional-action heading clearance signifying that a next heading is assumed to have to be followed from a conditional time at which a condition is verified, it comprises a step of displaying the next heading and the current heading followed by the aircraft at the current time.

14. A device for aiding the management of a flight, comprising:

an on-board communication computer, configured to receive control clearances, an analyser/router capable of determining the recognition time of the control clearance received by the on-board communication computer, and of attributing a destination flight plan to the control clearance as a function of the recognition time, the destination flight plan being the temporary flight plan when the recognition time is included in a first time slot and the destination flight plan is the secondary flight plan when the recognition time is included in a second time slot, longer than the first time slot, a means for computing a reception flight plan based on the said control clearance, at least one storage space dedicated to the storage of the reception flight plan, wherein the device computes the reception flight plan based on the control clearance, the device stores the reception flight plan in a memory space dedicated to the reception flight plan, and further comprising, prior to the computing the reception flight plan, the device determines a time with the analyser/router, called the recognition time, assumed to have to elapse between a current time and a time at which the control clearance is assumed to be recognized, and the device executes attribution by the analyser/router, to the control clearance, of a destination flight plan, as a function of the recognition time, the destination flight plan being a temporary flight plan when the recognition time is included in a first time slot and the destination flight plan being a secondary flight plan when the recognition time is included in a second time slot longer than the first time slot.

15. The device for aiding piloting according to claim 14, comprising a man-machine interface comprising at least one screen, a first screen(s) belonging to a flight control unit and the flight control unit comprises:

a first window capable of displaying the value of a current heading followed by an aircraft at a current moment, a second window capable of displaying the value of a next heading that the aircraft is assumed to have to follow and being determined by a heading control clearance, a selection means for allowing a pilot to select from the current heading and the next heading a heading assumed to have to be followed by the aircraft.

16. The device for aiding piloting according to claim 14, further comprising a means for selecting a substitution flight plan allowing the crew to initiate the copying of the reception flight plan into a memory space dedicated to the storage of a substitution flight plan of its choice, distinct from the reception flight plan.

17. The device for aiding piloting according to claim 14, further comprising a means for cancelling the insertion of a control clearance into a reception flight plan.

18. The device for aiding piloting according to claim 14, further comprising a means for initiating the computation of the destination flight plan based on a flight clearance and the storage of the destination flight plan in a dedicated storage space.

* * * * *